United States Patent Office 2,778,855
Patented Jan. 22, 1957

2,778,855
PRODUCTION OF HYDROXY ETHERS

Edward C. Shokal, Walnut Creek, and Paul A. Devlin, San Francisco, Calif., assignors to Shell Development Company, Emeryville, Calif., a corporation of Delaware No Drawing. Application June 1, 1953,
Serial No. 358,977

15 Claims. (Cl. 260—613)

This invention relates to the manufacture of hydroxy ethers by reacting epoxy compounds with organic hydroxy compounds. It deals with an improved catalytic method of carrying out the reaction whereby more efficient and economical production of desirable hydroxy ethers can be obtained.

Epoxide compounds, that is, cyclic ethers having an ether oxygen atom directly attached to two carbon atoms which are linked together directly or through not more than one intervening carbon atom in a heterocyclic epoxide ring of 3 to 4 atoms, and thus contain a

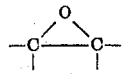

or a

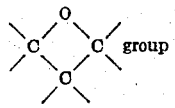 group are known to react, as a class, with alcoholic hydroxy compounds with formation of hydroxy ethers wherein an —OH group and an ether group are attached to carbon atoms adjacent to, or once removed from, each other. In many cases, the reaction can be carried out non-catalytically, but it is recognized that as a general rule catalysts are useful in accelerating the reaction. A wide variety of catalysts of different types have been suggested for this purpose. As pointed out in U. S. Patents 2,380,185 and 2,428,235, among the catalysts which have been proposed are neutral materials such as active charcoal or bleaching earths, acid-acting compounds such as sulfuric or phosphoric acid, and basic agents such as caustic soda, pyridine, etc. Stannic halides, as claimed in these patents, are superior to such proposed catalysts in these reactions. Acid-acting fluorine-containing compounds, as described in U. S. Patent 2,260,753, are another useful type of catalyst for the production of hydroxy ethers in this way. All of these previously proposed catalysts are subject to certain disadvantages, however. Basic catalysts tend to promote undesirable side reactions, especially condensation of epoxides. Neutral catalysts generally are of quite low activity. While the suggested strong acids are more active, they usually require relatively long reaction times which favor undesirable side reactions. Stannic halides, although not subject to these disadvantages, are corrosive and difficult to remove from the product.

It is an object of the present invention to overcome the disadvantages of such prior methods of producing hydroxy ethers. Another object is to provide a superior catalytic method for reacting epoxide compounds with organic hydroxy compounds. Still another object is to provide a practical and economical process adapted for industrial scale production of hydroxy ethers from epoxides. A special object is to produce hydroxy ethers in high yields and conversions from the more difficultly reactive non-tertiary epoxides, i. e. epoxides having not more than two carbon atoms directly attached to a carbon atom to which an epoxy oxygen atom is directly joined. Further objects and advantages of the invention will be apparent from the following description in which some of the advantageous methods of carrying out the new process will be given by way of illustration without, however, limiting the invention to such embodiments.

In accordance with the invention, these objects are achieved by reacting an epoxide compound with an alcoholic hydroxy compound in the presence of a catalytic amount of perchloric acid ($HClO_4$). Perchloric acid is a strong oxidizing agent, and it might therefore have been predicted that its use as a catalyst would lead to excessive by-product formation. Also, in view of the lower activity of the previously tried acid catalysts, it would be expected that with perchloric acid long reaction times would likewise be required and that the yields would accordingly suffer. Whether or not these were the reasons, apparently no one has previously investigated perchloric acid as a catalyst for the reaction of epoxy compounds with hydroxy compounds, and it was unexpected to find that perchloric acid is a unique, outstanding catalyst which promotes rapid reaction and gives high yields of desirable hydroxy ethers. The results it gives are in these respects of the same order as, or better than, those obtainable with metal halide catalysts of the type of stannic chloride. But, perchloric acid has the important advantage over stannic chloride as a catalyst that it can be removed readily from the reaction product and can be used to carry out the reaction in simpler and cheaper equipment.

Perchloric acid has been found to be especially effective with epoxide compounds having 1,2- or 1,3-oxide rings as a class in forming hydroxy ethers with all types of alcoholic hydroxy compounds. By alcoholic hydroxy compounds, as used herein and in the appended claims, reference is made to compounds which contain at least one hydroxyl group linked to a carbon atom which is otherwise attached only to carbon and/or hydrogen atoms, such as are present in alcohols and phenols, in contradistinction, for example, to compounds which contain as the only hydroxyl group or groups those linked to carbonyl carbon atoms as in the carboxylic acids.

Representative of the epoxide compounds which have been found to be useful in the perchloric acid-catalyzed reactions of the invention are, for instance, the alkylene oxides such as ethylene oxide, propylene oxide, butene-1 oxide, butene-2 oxide, butadiene monoxide, butadiene dioxide, cyclopentylene oxide, styrene oxide, etc., as well as substituted alkylene oxides which contain various substituent groups in addition to the epoxide group like the epihalohydrins such as epichlorhydrin, epibromhydrin, alpha-methyl epichlorhydrin, beta-methyl epichlorhydrin, alpha,alpha'-dimethyl epibromhydrin, etc.; nitro epoxide compounds such as nitro glycide, beta-ethyl nitro glycide, nitro styrene oxide, etc.; epoxide ethers such as methyl glycidyl ether, isopropyl glycidyl ether, secondary butyl beta-methyl glycidyl ether, cyclopentyl glycidyl ether, phenyl glycidyl ether, etc.; epoxide thioethers such as ethyl glycidyl thioether, cyclohexyl alpha-methyl glycidyl thioether, tolyl glycidyl thioether, etc.; epoxide esters such as glycidyl acetate, glycidyl propionate, beta-propyl glycidyl naphthenate, glycidyl benzoate, epoxidized glycerol trioleate, and epoxidized natural unsaturated fatty esters, etc., and the like.

1,2-epoxides such as the foregoing are preferred epoxide compounds for use in the invention, particularly on account of their availability, but 1,3-epoxides, such as trimethylene oxide, 1,3-epoxybutane, 1,3-epoxycyclohexane, 1,3-epoxy-4-chlorobutane and the like, can be similarly reacted in the presence of perhalic acid catalysts to form hydroxy ethers in accordance with the invention.

As alcoholic hydroxyl compounds which can be reacted with such epoxide compounds in the presence of perchloric acid as catalyst are the monohydric and polyhydric alcohols which can be primary, secondary or tertiary in character and the phenolic compounds. It has been found that these hydroxyl compounds can be used successfully in the process when they contain unsaturated linkages in the molecule as well as when the saturated compounds are used and that those substituted by halogen, nitro, ether, ester and like groups are as satisfactory in the reaction as the unsaturated alcoholic hydroxyl compounds. Examples of monohydric alcohols which are suitable include such alcohols as methyl, ethyl, isopropyl, normal butyl, secondary butyl, tertiary butyl, tertiary amyl, lauryl, cetyl, allyl, crotyl, propargyl, cyclopentyl, cyclohexyl, benzyl, phenylethyl, furfuryl, etc. Among the polyhydric alcohols there may be mentioned ethylene glycol, propylene glycol, isobutylene glycol, trimethylene glycol, cyclopentene glycol, styrene glycol, glycerine, beta-methyl glycerine, alpha-phenyl glycerine, erythritol, pentaerythritol, mannitol, sorbitol, etc. Typical of the substituted alcohols which have been found to be operative are, for instance, the ethylene halohydrins, particularly ethylene chlorhydrin, propylene bromhydrin, glycerine monochlorhydrin, glycerine dichlorhydrin, dichloro tertiary butyl alcohol, methyl glycerol ether, isopropyl glycerol thioether, methyl ethylene glycol ether, phenyl glycerol ether, diisopropyl glycerol ether, secondary butyl beta-methyl glycerine ether, ethylene glycol monoacetate, trimethylene glycol monobutyrate, tertiary butyl glycerol ether monoacetate, isopropyl beta-methyl glycerine thioether monobenzoate, ethyl lactate, dinitroglycerine, etc. Among the phenolic compounds which can be used along with or instead of the foregoing alcoholic compounds, preference is given to those which contain only a single hydroxy group linked to the aromatic nucleus and compounds known as alkylated monohydroxy phenols which contain a single hydroxy group linked directly to a carbon atom of the aromatic nucleus and one or more alkyl groups linked to other carbon atoms of the ring. Particular representative compounds include phenol, the cresols, the xylenols, ethyl phenol, propyl phenol, tertiary butyl phenol, tertiary amyl phenol, octyl phenol, resorcinol, brom cresol, chlor phenol, catechol, orcinol, pyrogallol, phlorblusinol, eugenol, trinitro phenol, resorcinol monoacetate, resorcinol monomethyl ether, and the like. Hydroxyl compounds which contain both phenolic and aliphatic or cycloaliphatic hydroxyl groups can also be used, examples of suitable compounds of this type being the ortho-, meta- and para-hydroxybenzyl alcohols, for instance.

The perchloric acid-catalyzed reaction can be carried out in a relatively wide range of temperatures. The reaction begins immediately upon contact of the reactants at temperatures as low as 0° C. While it may be initially slow at low temperatures, due to the exothermic nature of the reaction between epoxide compounds and alcoholic hydroxy compounds the reaction soon becomes vigorous with a resulting increase in temperature of the reaction mixture. The induction period can be reduced or eliminated by heating the reaction mixture or preheating one or both of the reactants, preferably the alcoholic hydroxy reactant, so that rapid reaction starts promptly. It is often desirable to cool the reaction mixture after initial heating to prevent the temperature rising to a point at which undesirable decomposition or other side reactions occur. In general, it is desirable to keep the temperature below about 250° C. Heating is often desirable to bring about completion of the reaction in a shorter period of time. Reaction at about the boiling point of the reaction mixture is usually a convenient method of carrying out the process which can be conducted under normal, reduced or elevated pressure. Particularly with lower boiling reactants such as ethylene oxide, propylene oxide, methanol, etc., it is usually desirable to operate under superatmospheric pressure sufficient to maintain the reactants in the liquid phase at a temperature within the preferred range of about 75° C. to about 150° C.

One suitable method of batchwise reaction employs an autoclave or kettle fitted with a coil or jacket connected with sources of heating and cooling media such as steam and water, and having a reflux condenser for returning evolved vapors to the reaction. Alternatively, the reaction can be carried out continuously in a suitably jacketed reaction coil, time tank or other type of reaction vessel through which the mixture of epoxide compound, alcoholic hydroxy compound and perchloric acid catalyst in proper proportions, with or without a solvent or diluent, can be passed continuously under controlled conditions of temperature and pressure at a rate regulated so as to provide a suitable residence time for the desired reaction. Whatever procedure is followed in carrying out the reaction, it has been found that, although the reaction time required for complete reaction varies somewhat depending upon the particular epoxide compound and alcoholic hydroxy compound chosen, two hours or less, usually less than sixty minutes, are sufficient for good yields and conversions with the new perchloric acid catalyst. As a result, large volume outputs can be achieved with a relatively small investment in reactor capacity by the use of this catalyst.

It is advantageous to use a stoichiometric excess of the alcoholic hydroxy compound in carrying out the reaction. Preferably at least two, and more preferably about four to ten, moles of hydroxy compound are used per epoxide equivalent of the epoxide compound or compounds employed. In this way side reactions are repressed and high yields and conversions of epoxide compound to hydroxy ether are promoted. Less excess hydroxy compound can be used by carrying out the reaction in a suitable inert diluent which is preferably a mutual solvent for the reactants and catalyst. Such solvents are especially useful when carrying out the process with hydroxy compounds of high melting point. More usually, however, it is preferred to employ normally liquid hydroxy compounds as reactants and to use a sufficient amount to act as such diluent since recovery of the product is thereby simplified. The excess unreacted hydroxy compound remaining after the reaction can be recovered, usually by distillation, for example, and returned to the process for further reaction with epoxide compound.

With perchloric acid as catalyst, it is preferably used in the form of aqueous solutions of up to 72% concentration because of their greater stability. From about 0.001 to 0.1 mole, preferably 0.005 to 0.05 mole, of perchloric acid is used per epoxide equivalent of the initial reaction mixture. It is desirable, in order to reduce the explosion hazard in manufacturing operations, to keep the concentration of $HClO_4$ below 5% at all times during reaction and product recovery. Most preferably, the catalyst is removed from the reaction mixture before recovery of the product. This removal can be successfully carried out by contacting the crude reacted mixture through an anion exchanger. Anion exchange resins such as Duolite A2 (a phenolic type resin manufactured by Chemical Process Company) or Amberlite IR-4B (an amine type resin manufactured by Rohm and Haas Company) have been found to be satisfactory. The crude mixture can be stirred with the granular exchanger for a few minutes at ordinary temperature and the exchanger containing the adsorbed catalyst can then be filtered off or the reacted mixture can be percolated through a column of the exchanger, or other suitable methods of contacting the mixture with the chosen exchanger can be used. After catalyst recovery the mixture can be distilled to remove the unreacted starting materials and then to take off pure product. A satisfactory but somewhat less preferred alternative method of recovering the product is by distillation of the crude reaction mixture in the presence of sufficient of an inert, preferably high boiling, paraffinic hydrocarbon, for example paraffin wax, to keep the concentration of perchloric acid in the distillation bottoms below about 5% by weight and thus obviate any hazard from the catalyst. The thus recovered catalyst can be returned to the reaction either in solution in the paraffin or after extraction therefrom with water or with a water-soluble alcohol being used as one of the reactants in the process.

The new method of reaction has the advantage over methods of reaction using other halide-containing catalysts that hydroxy ethers of much lower halide content are produced. In fact, with perchloric acid as the catalyst there is so little chlorine therefrom appearing with the product that it is usually entirely unnecessary to carry out any special purification of the hydroxy ether to remove such impurities.

The following examples show in more detail how the new process can be carried out.

Example I

A ten percent solution by weight of ethylene oxide in secondary butyl alcohol was reacted in the presence of 1.0% of perchloric acid based on the ethylene oxide. At approximately 100° C. the epoxy value of the solution fell to 0.00 in 57 minutes, showing complete conversion of the ethylene oxide. The yield of secondary butyl monoether of ethylene glycol was 58% and the product had a hydroxyl value of 0.847 equivalent per 100 grams and contained only 0.06% to 0.09% chlorine. The bulk of the remaining ethylene oxide was converted to the disecondary butyl ether of ethylene glycol.

Under similar conditions using isopropyl alcohol and propylene oxide as the reactants, an equally good yield of the isopropyl monoether of propylene glycol was obtained.

Example II

Epichlorhydrin and secondary butyl alcohol in a mole ratio of 1 to 6 were reacted at reflux temperature in the presence of 0.0089 mole of perchloric acid per mole of epichlorhydrin. Complete conversion of the epichlorhydrin with substantially quantitative yield of the secondary butyl monoether of glycerine monochlorhydrin was obtained within four hours' reaction time.

Using normal butyl alcohol instead of secondary butyl alcohol, the reaction was a little faster and slightly better yields were obtained.

When concentrated sulfuric acid, phosphoric and nitric acids were used as catalysts for the reaction of secondary butyl alcohol with epichlorhydrin under the same conditions, the reaction took place very much more slowly, as shown by the following results:

| Catalyst | Initial Epoxide Value of the Solution | Reaction Time, hrs. | Final Epoxide Value of the Solution | Conversion of Epichlorhydrin (wt. percent) |
|---|---|---|---|---|
| Perchloric acid | 0.144 | 4 | 0.00 | 100 |
| Sulfuric acid | 0.184 | 18 | 0.109 | 41 |
| Phosphoric acid | 0.185 | 29 | 0.137 | 26 |
| Nitric acid | 0.164 | 29 | 0.138 | 16 |

Example III

Allyl glycidyl ether was produced by reacting allyl alcohol with epichlorhydrin in the presence of 0.9% by weight of perchloric acid based on the epichlorhydrin. A mole ratio of allyl alcohol to epichlorhydrin of 3 to 1 was used with a reaction temperature of 100° C. for 2 hours. The reaction product was reacted with caustic soda at 30° C. and allyl glycidyl ether was recovered in excellent yield.

Example IV

Butadiene dioxide reacted with ethyl alcohol under the conditions of Example I, except using a 5% solution of the epoxide in the alcohol instead of a ten percent solution, gives an excellent yield of the diethyl ether of erythritol.

In the same way, using ethylene oxide in glycerine solution as the reactants, one obtains the monoethylene glycol monoether of glycerine in a good yield.

Example V

Para-tertiary amyl phenol and epichlorhydrin in a mole ratio of 3:1 react at about 95° C. in the presence of perchloric acid. Addition of isooctane to the reacted mixture causes the greater part of the excess amyl phenol to crystallize out and, after removal of the catalyst with Duolite A2, the para-tertiary amyl phenyl ether of glycerine monochlorhydrin, boiling in the range of 145° C. to 154° C. at 0.5 mm. pressure, is obtained in good yield.

Under the same conditions, 2,2-bis(4-hydroxyphenyl)-propane can be reacted successfully with epichlorhydrin to produce the corresponding 2,2-bis(4-hydroxyphenyl)-propane mono- or di-glycerine monochlorhydrin ethers or mixtures thereof, depending upon the proportions of epichlorhydrin to 2,2-bis(4-hydroxyphenyl)propane used.

We claim as our invention:

1. A process for producing a hydroxy ether which comprises reacting an epoxide compound having at least one hydrogen atom attached to each of the carbon atoms to which an epoxy oxygen atom is directly linked with an organic hydroxy compound of the group consisting of the alcohols and phenols in the presence of about 0.001 to 0.1 mole of perchloric acid per epoxide equivalent of the initial reaction mixture.

2. A process in accordance with claim 1 wherein the alcoholic hydroxy compound is an aliphatic alcohol.

3. A process of producing a hydroxy ether which comprises reacting an alkylene oxide having at least one hydrogen atom attached to each of the carbon atoms to which the epoxy oxygen atom is directly linked with an organic hydroxy compound of the group consisting of the alcohols and phenols in the presence of about 0.001 to 0.1 mole of perchloric acid catalyst per mole of alkylene oxide in the initial reaction mixture.

4. A process of producing a hydroxy ether which comprises reacting an alkylene oxide having at least one hydrogen atom attached to each of the carbon atoms to which the epoxy oxygen atom is directly linked with an aliphatic monohydric alcohol in the presence of about 0.001 to 0.1 mole of perchloric acid per mole of alkylene oxide in the initial reaction mixture.

5. A process in accordance with claim 4 wherein the alcohol is a saturated non-primary alcohol of three to eighteen carbon atoms per molecule.

6. A process in accordance with claim 5 wherein the alcohol is a secondary alcohol.

7. A process of producing a monoether of ethylene glycol which comprises reacting a mixture of an alcohol and ethylene oxide containing a stoichiometric excess of said alcohol in the presence of about 0.001 to 0.1 mole of perchloric acid per mole of ethylene oxide in the initial reaction mixture.

8. A process in accordance with claim 7 wherein the perchloric acid is removed from the reaction mixture by adsorption on an anion exchange agent prior to recovery of the product from the excess alcohol.

9. A process of producing secondary butyl monoether of ethylene glycol which comprises reacting secondary butyl alcohol with ethylene oxide in the presence of about 0.001 to 0.1 mole of perchloric acid per mole of ethylene oxide in the initial reaction mixture.

10. A process of producing an ether of glycerine monochlorhydrin which comprises reacting epichlorhydrin with an alcoholic hydroxy compound in the presence of about 0.001 to 0.1 mole of perchloric acid per mole of epichlorhydrin in the initial reaction mixture.

11. A process in accordance with claim 10 wherein said hydroxy compound is an aliphatic alcohol.

12. A process in accordance with claim 10 wherein said hydroxy compound is a phenol.

13. A process of producing secondary butyl monoether of glycerine monochlorhydrin which comprises refluxing a mixture of glycerine epichlorhydrin and an excess of secondary butyl alcohol in the presence of about 0.001 to 0.1 mole of perchloric acid per mole of epichlorhydrin in the initial reaction mixture.

14. A process for producing a hydroxy ether which comprises reacting an epoxide compound with an organic hydroxy compound of the group consisting of the alcohols and phenols in the presence of about 0.001 to 0.1 mole of perchloric acid per epoxide equivalent of the initial reaction mixture.

15. A process for producing allyl monoether of glycerine monochlorhydrin which comprises reacting epichlorhydrin with allyl alcohol in the presence of about 0.001 to 0.1 mole of perchloric acid per mole of epichlorhydrin in the initial reaction mixture.

References Cited in the file of this patent

UNITED STATES PATENTS

| 2,213,477 | Steindorff et al. | Sept. 3, 1940 |
| 2,246,762 | Schirm | June 24, 1941 |
| 2,260,753 | Marple et al. | Oct. 28, 1941 |
| 2,380,185 | Marple et al. | July 10, 1945 |